United States Patent

Cheng et al.

[15] 3,678,696

[45] July 25, 1972

[54] FRACTIONAL SOLIDIFICATION PROCESS WITH HEAT REUSE BY THE APPLICATION OF PRESSURE

[72] Inventors: Chen Yen Cheng, 2443 So. Kramerig St., Denver, Colo. 80222; Sing-Wang Cheng, No. 83, Chang-An E. Rd. Section 1, Taipei, Formosa, China /Taiwan

[22] Filed: March 11, 1968

[21] Appl. No.: 712,297

[52] U.S. Cl..................................62/58, 23/295, 252/301.1
[51] Int. Cl..............................................................B01d 9/00
[58] Field of Search.....................................................62/58

[56] References Cited

UNITED STATES PATENTS

| | | | |
|---|---|---|---|
| 3,234,747 | 2/1966 | McMahon et al. | 62/58 |
| 3,354,083 | 11/1967 | Cheng et al. | 62/58 |
| 3,398,547 | 8/1968 | Sliepcevich et al. | 62/58 |
| 3,399,538 | 9/1968 | Sliepcevich et al. | 62/58 |
| 3,410,339 | 11/1968 | Wiegandt | 62/58 |

*Primary Examiner*—Norman Yudkoff
*Assistant Examiner*—R. T. Foster

[57] ABSTRACT

A fractional solidification process for separating relatively pure water from an aqueous solution, separating a solution into its components and purifying an impure substance by the so-called progressive freezing operation in which a feed solution is circulated through a conduit and is cooled through the conducting surface of the conduit. The improvement comprises of the followings:

1. Heat reuse is achieved by taking advantage of the change of melting point of a substance due to the application of pressure.
2. A unified freezer-melter which contains two sets of conduits, A-conduits and B-conduits, is used. A-conduits and B-conduits are in heat exchange relation through a metallic conductor and each set of these conduits are used alternately as a freezer and a melter. For separation of water, a high pressure is applied during the melting operation, and for the separation of other substances, a high pressure is applied during the freezing operation to create the temperature difference for heat transfer which is required in the heat reuse.

10 Claims, 12 Drawing Figures

Patented July 25, 1972
3,678,696
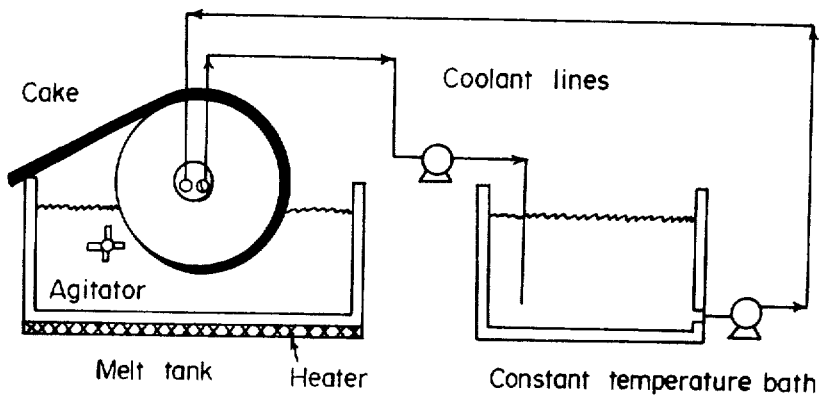
Fig. 1. A single stage rotary-drum process.
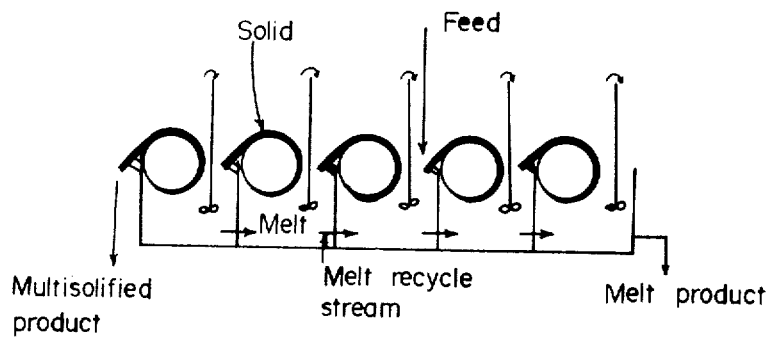
Fig. 2. A multistage rotary-drum process.
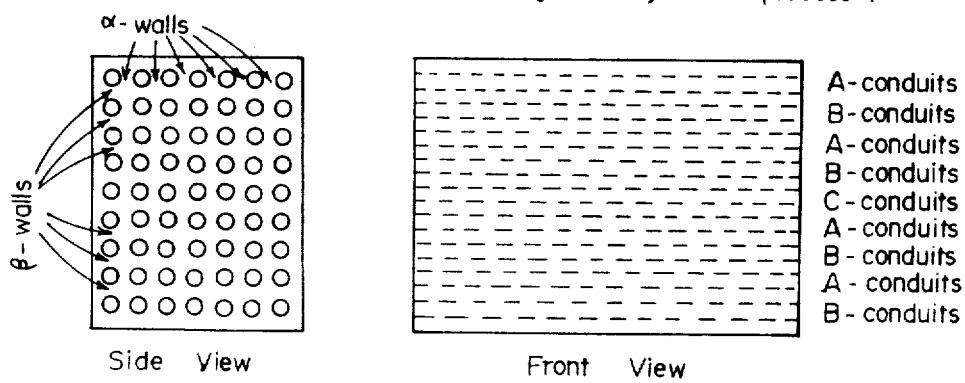
Fig. 3. A metal block freezer-melter unit
INVENTOR
Chen-Yen Cheng

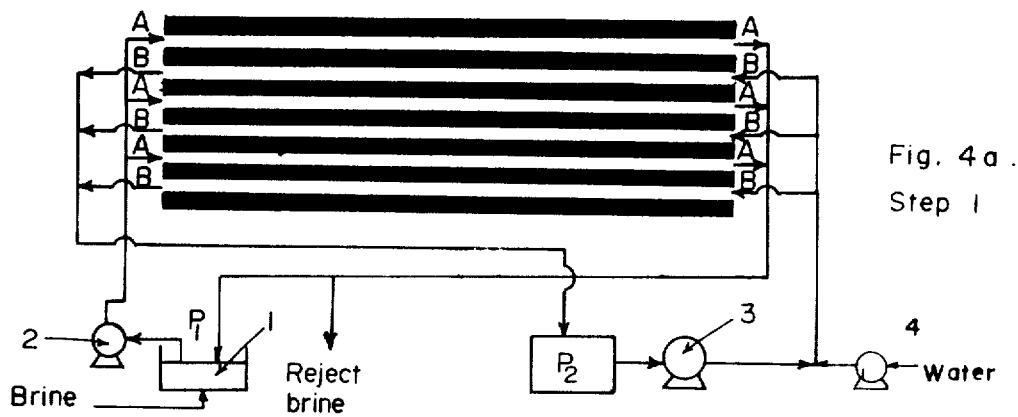
Fig. 4a. Step 1
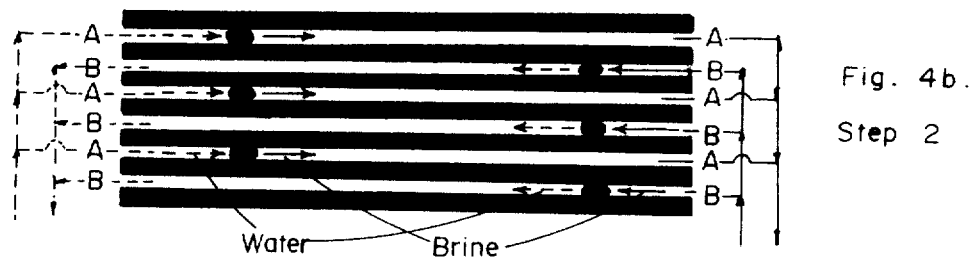
Fig. 4b. Step 2
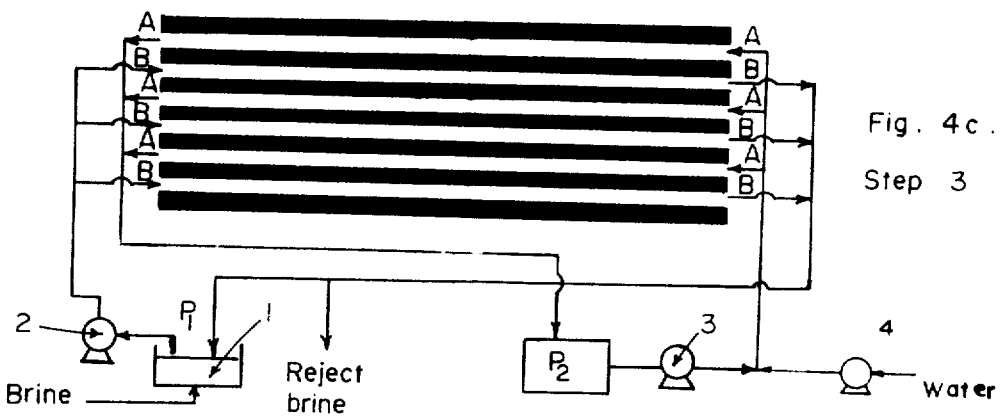
Fig. 4c. Step 3
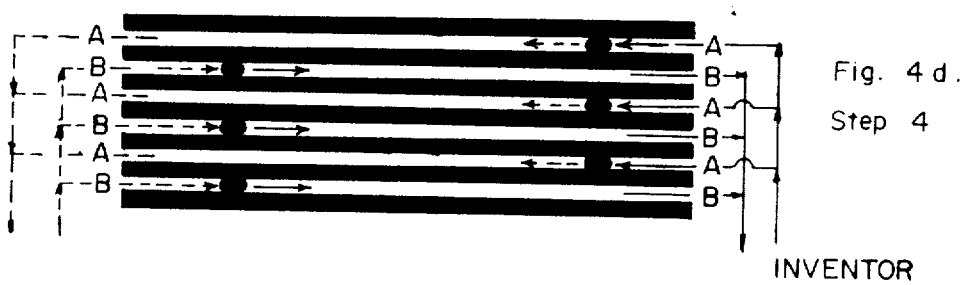
Fig. 4d. Step 4
INVENTOR
Chen-Yen Cheng

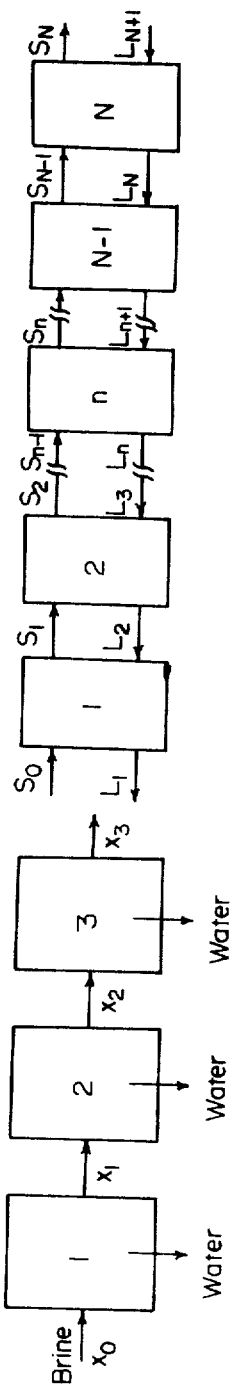
Fig. 7. A series-parallel multistage process.
Fig. 8. A countercurrent multistage process.
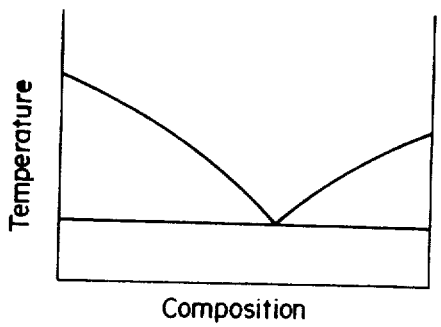
Fig. 5a. Phase diagram of components exhibiting complete immiscibility in the solid state.
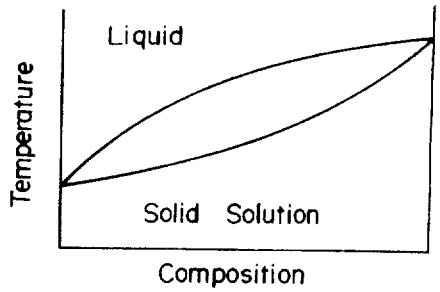
Fig. 5b. Phase diagram of components exhibiting complete solid solution.
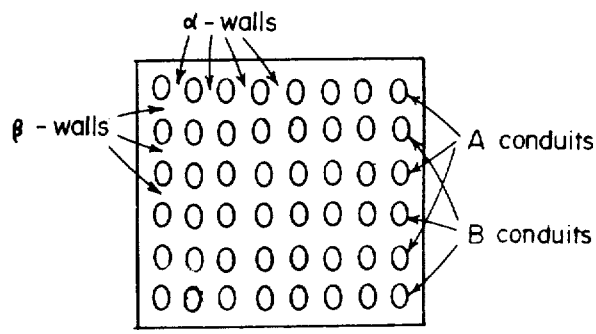
Fig. 6. A freezer-melter with oval shaped conduits.
INVENTOR
Chen-Yu Cheng

FRACTIONAL SOLIDIFICATION PROCESS WITH HEAT REUSE BY THE APPLICATION OF PRESSURE

I. INTRODUCTION

This invention is related to a fractional solidification process by the so-called progressive freezing operation in which a solution (or a melt) is pumped through a conduit and is cooled through the conducting surface of the conduit under such a well controlled condition as to form a well defined solid/liquid interface which progresses through the liquid in the direction perpendicular to the conducting surface. The essential features incorporated in a process of the present invention are as follows:

1. A unified freezer-melter is used in the process, so that the freezer part and the melter part of the unit are in heat exchange relation with each other. An extruded metal block with honey-combed conduits may be used as a unified freezer-melter unit. This design enable mass production and reduce fabrication cost.
2. Heat reuse is attained by taking advantage of the melting point lowering of water or the melting (or freezing) point raising of an ordinary substance due to the application of pressure. In the purification of an aqueous solution, the melter part is pressurized to a pressure high enough to lower the melting point of ice to a temperature somewhat lower than the freezing temperature of the aqueous solution so that the heat liberated in the freezing of the aqueous solution can be used in the melting of the ice. In the purification of an organic solution, the freezer part is pressurized to a pressure high enough to raise the freezing point of the organic solution to a temperature somewhat higher than the melting temperature of the organic solid in the melter part of the unit. Again, the heat liberated in the freezing operation is used in the melting operation.
3. The freezing operation is carried out under a well controlled condition, viz. low freezing rate, high mixing at the solid/liquid interface, to minimize constitutional supercooling so that the crystal formed entrapps very little mother liquor.
4. A simple purification mechanism consisting of a deformable elastic float may be used to simply displace mother liquor in the conduit after a freezing operation. This purification method eliminate a rather costly conventional washing method.
5. Power requirement per unit production is very low, since an efficient method can be used in the pressurization operation.

These improvements reduce the initial plant cost, plant maintenance cost and operating cost for such a separation process.

A process of the present invention is quite effective in separating a solution into its components and in the purification of an impure substance. The process is particularly adaptable to a multistage countercurrent flow operation, and, thus, can be used in separating a system which forms solid solutions. The process can be applied to:

1. separating fresh water from an aqueous solution such as a brackish water, sea water and waste water.
2. concentrating milk, cane juice, orange juice, tomato juice and other fruit juices, enzyme solutions, colloids and suspensions,
3. purification of organics such as p-xylene, m-xylene, benzene, wax, naphthalene, etc.,
4. initial enriching operation in the manufacture of heavy water from ordinary water.

It is instructive to compare the present process with a rotary-drum crystallization process, since both of these two processes are fractional solidifications processes and have similar applications. The significance of the present invention can be appreciated by realizing the advantages of the present process as compared with the rotary-drum process. For the convenience of later discussions, a single stage rotary-drum crystallization process and a multistage rotary-drum crystallization process are briefly outlined in the following paragraphs. The rotary drum crystallization process is described in detail in chapter 15 of a book entitled "Fractional Solidification," edited by Zief and Wilcox and published by Marcel Dekker, Inc. New York in 1967.

Basically, a single stage rotary-drum crystallizer consists of a horizontally mounted hollow cylinder which is partially immersed in the solution (or the melt) with cooling medium entering and leaving the inside of the cylinder through hollow trunnions.

FIG. 1 shows a sketch of a single stage unit. As the cylinder rotates, crystals that have formed on the immersed portion of the cylinder emerge from the solution (or the melt) as a crystalline cake, are air cooled to some degree, and the cake is removed by a suitable device, such as a doctor knife. Good agitation of the melt near the surface of the drum must be attained for effective mass-transfer rate and avoid constitutional supercooling. The cooling medium which becomes heated in the crystallizer is cooled by a regeneration unit before being recycled.

FIG. 2 illustrates a multistage rotary-drum crystallization system. It show that a feed is introduced to a mid-point in the system. Cake crystals obtained in a stage is removed by a doctor knife and moved to the stage next to it in the left where it is remelted. In the overall system, cake crystals move successively to the left and melt moves successively to the right. Cooling is obtained by a cooling medium and heating is obtained by a separate heating source. No provision is made to reuse the heat energy. The number of drums required, for any given separation, would depend upon the impurity in the feed and the level of impurity desired in the product and the nature of the system — i. e. whether the system forms solid solutions or not. The practical limitations of heat transfer and mechanical agitation of the solution (or the melt) would also affect the number of drums required, because these two items are the primary variables affecting the degree of separation.

From the above descriptions, the disadvantages of a rotary-drum crystallization process can be summarized as follows:

1. The equipment cost per unit heat transfer area is very high. Therefore, in practice, a rather large $\Delta t$ has to be used to obtain a practicable heat transfer rate.
2. This high heat transfer rate together with the ineffectiveness of mechanical agitation of the solution tend to cause constitutional supercooling which again causes entrapping of impurities in the cake crystal.
3. No provision is made to reuse the heat of freezing in the melting of the cake. Therefore, the operating cost is rather high.

II. PROCESS DESCRIPTION

In this section, we will first introduce the present invention by explaining a single stage process for separating fresh water from an aqueous solution and then show the special features and the background principles of the process and also classify substances to be treated into various types. We will then describe a single stage process applied to the purification of a substance other than water and show the modifications which have to be made. Finally, we will describe a multistage process with a series-parallel flow arrangement and a multistage process with a countercurrent flow arrangement.

1. A single stage process for separating fresh water from an aqueous solution.

FIG. 3 shows a unified melter-freezer unit used in this process. It is a metal block with straight conduits. The conduits in a block are divided into three sets, viz. set A, set B and set C. The conduits belonging to these sets will be collectively denoted by A-conduits, B-conduits and C-conduits respectively. The A-conduits and the B-conduits are the main conduits and the C-conduits are auxiliary conduits. We will focus our attention to the A- and B-conduits in the following discussion, and leave C-conduits out for the time being. It will be noticed that a substance placed in the A-conduits is in heat exchange relation with another substance placed in the B-conduits by heat transfer through the metal block.

The unified melter-freezer unit is operated in a cyclic fashion and each cycle consists of four component steps. These, four steps are illustrated by FIG. 4a, 4b, 4c and 4d respectively and are also summarized by Table 1.

TABLE 1

Cyclic operation of a unified freezer-melter unit.

| A-conduits | | B-conduits | |
|---|---|---|---|
| Step 1 | brine is frozen at a low pressure, $P_1$ | ice is melted at a high pressure, $P_2$ |
| Step 2 | brine is displaced by fresh water | fresh water is displaced by brine |
| Step 3 | ice is melted at high pressure, $P_2$ | brine is frozen at low pressure, $P_1$ |
| Step 4 | fresh water is displaced by brine | brine is displaced by fresh water |

These steps are farther explained in detail as follows:

STEP 1

Referring to FIG. 4a, an aqueous solution such as a brackish water feed is precooled by heat exchange with both the reject brine and the product water to be described and is mixed with a recycle solution stream to be described in tank 1. Let us assume that the system has been operated from some time and there is a layer of ice deposited on B-conduits due to the previous cycle. We circulate the brine from tank 1, passes it through A-conduits from the left-end to the right-end under a low pressure, $P_1$, reject a part of the solution and return the remaining brine to tank 1. We also circulate fresh water by pump 3 through the B-conduits from the right-end to the left-end under a high pressure $P_2$. The pump 3 is a high pressure low head pump used in the high pressure circulation operation.

It is a familiar fact that the freezing temperature of an aqueous solution is lower than the freezing temperature of pure water under the same pressure due to the so-called "freezing point depression" phenomena. It is also a familiar fact that the melting point of ice is lowered by about 1° C due to the increase in applied pressure by 100 atm. Therefore, if the pressure $P_2$ is high enough, the ice existing in the B-conduits will melt at a temperature lower than the freezing temperature of the brine in the A-conduits under pressure $P_1$. Under such an operating condition, heat flows from the brine in the A-conduits to the ice in the B-conduits. Therefore, ice freezes out from the brine in A-conduits while ice melts in the B-conduits. At the end of this step, a uniform layer of ice is deposited on the A-conduits and brine fills the remaining space of the A-conduits. At this time, the B-conduits are free of ice deposit and are filled by high pressure fresh water. It will be explained later that the operating condition is so controlled to form uniform layer of pure ice crystal in this operation.

A part of the brine emerged from the freezer ( A-conduits ) become the reject brine which is heat exchanged with the incoming feed brine before being removed from the system. This heat exchange operation is not shown in FIG. 4. During the melting operation some water is pumped in by a high pressure pump 4 in order to compensate for the volume shrinkage due to the ice-melting. Product water is removed from the system during step 2.

STEP 2

It has been described that at the end of step 1, the remaining void space of the A-conduits is filled with brine described, is step 3, the A-conduits will become a melter and B-conduits will become a freezer. Step 2 is a transition period between step 1 and step 3 during which the brine in the A-conduits and the fresh water in the B-conduits have to be replaced by fresh water and brine respectively. These displacement operations may be simply achieved by pumping fresh water and brine respectively in the A-conduits and B-conduits. The intermixing at the fluid boundaries are not excessive because the conduits are small in cross section and the ice-deposit in the A-conduits is uniform.

The net water production is equal to the water displaced in B-conduits minus the water used in the displacement of A-conduits and minus the water pumped in by pump 4 in step 1. This product water is heat exchanged with feed brine before being removed from the system.

If desired, we may place a deformable elastic float in each conduit to prevent mixing of brine and fresh water during these displacement operations. The float in a conduit is thus moved from one end to the other end during this operation. These operations are illustrated by FIG. 4b. These floats will later be restored to the original ends again by the reverse displacement operation during step 4. It should be mentioned that these floats are stored in inactive positions during step 1 and step 3. The free cross sectional area is different in step 2 and step 4, because of the presence of an ice-deposit during step 2. Therefore, the float used should be of an expandable nature and adjusts itself to the change in the conduit size. Such a deformable elastic float can be made.

STEP 3

During this step, the A-conduits are used as a melter and the B-conduits are used as a freezer. Refering to FIG. 4c, brine is circulated through B-conduits under the low pressure $P_1$ and fresh water is circulated through the A-conduits under the high pressure $P_2$. Heat of freezing liberated in the B-conduits is utilized in the melting of ice in the A-conduits. The discussions made in connection with step 1 apply to this step by simply interchanging A-conduits with B-conduits and by interchanging low pressure brine with high pressure fresh water.

STEP 4

This step is similar to step 2, and the discussions given in connection with step 2 apply to this step with appropriate changes. The operation is illustrated by FIG. 4d.

2. The Special Features and the Basic Principles which Underlie the Present Process.

In this section, we will discuss the problems of classifying mixtures, the method of heat reuse, the principle of progressive freezing operation, the design and construction of the unified freezer-melter unit and the energy consumption required in carrying out the process.

1. Classification of mixtures.

A mixture to be purified may be purified may be a colloidal mixture, a suspension or a solution. Practically pure solvent can be frozen out and be separated from a colloidal mixture and a suspension under well controlled condition. A solution may be classified into two types depending on whether the constituents of the solution form a solid solution or not. In the former case, practically pure solvent can be separated from the mixture by the progressive freezing operation. In the latter case, the solid frozen from the mixture is a solid solution of the constituents: Therefore, in order to obtain pure constituents, multistage operation has to be used. The operation is similar to fractional distillation process, and can be properly called a fractional crystallization process. The phase diagram of the former and the latter cases are illustrated respectively by FIG. 5a and FIG. 5b. An example to the former case is the $H_2O$-NaCl system. An example to the latter case is the tridecane-tetradecane system. Table 2 shows the freezing point of $H_2O$-NaCl system. It shows how the freezing temperature is lowered as the salinity increases.

TABLE 2

Freezing Temperature of NaCl-$H_2O$ System

| % NaCl | Freezing Point (°C) | % NaCl | Freezing Point (°C) |
|---|---|---|---|
| 0 | 0.00 | 15 | −10.88 |
| 1 | −0.58 | 16 | −11.90 |
| 2 | −1.13 | 17 | −12.93 |
| 3 | −1.72 | 18 | −14.03 |
| 4 | −2.35 | 19 | −15.21 |
| 5 | −2.97 | 20 | −16.46 |

| | | | |
|---|---|---|---|
| 6 | −3.63 | 21 | −17.78 |
| 7 | −4.32 | 22 | −19.19 |
| 8 | −5.03 | 23 | −20.69 |
| 9 | −5.77 | 23.3(E) | −21.13 |
| 10 | −6.24 | 24 | −17.0* |
| 11 | −7.34 | 25 | −!10.4* |
| 12 | −8.17 | 26 | −2.3* |
| 13 | −9.03 | 26.3 | 0.0* |
| 14 | −9.94 | | |

2. Heat reuse by pressure application.

The shape and direction of a univariant P/T curve for melting point of a substance is given by the Clapeyron-Clausius equation, $$\frac{dP}{dT} = \frac{\Delta H \cdot 1}{T(V_1 - V_s)}$$

in which ΔH is the (molar or specific) heat absorbed in the transition of solid phase to liquid phase, and $V_1$ and $V_s$ are the (molar or specific) volumes of liquid and solid phases respectively.

The melting point is seen to be raised ( positive slope) by P, if the solid is denser than the liquid; a negative slope is found in those few cases ( water, bismuth, gallium ) where the liquid is denser than the solid. According to P.W. Bridgman, melting point of water drops by one degree centigrade by increase in the applied pressure of about 100 atmospheres, and the general tendency of all systems is to have a positive slope of the fusion curve, the average value, as observed by Bridgman, being 50–60 atm./deg. ° C. In other words, increase in applied pressure by 100 atm. will cause m.p. of water to be dropped by 1° C, while increase in applied pressure by 50–60 atm. will cause m.p. of a common substance to be raised by 1° C.

The idea of heat reuse by pressure application may be illustrated as follows: Assuming that we try to freeze an aqueous solution containing 1 percent NaCl and utilize the heat of freezing in the melting of ice so formed by the present process. The freezing temperature of 1 percent NaCl solution is −0.58° C. Allowing 1° C temperature differential for heat transfer, the ice has to be melted at −1.58° C. Since melting point of ice is lowered by 1° C per 100 atm., the applied pressure should be 158 atm.

3. Progressive freezing operation.

The solidification of a solution ( or a melt ) on a cooled surface involves the transfer of heat and mass. If the solution ( or the melt ) is stationary or has only a small velocity with respect to the surface, the mechanism employs conduction and molecular diffusion and in these circumstances the transfer of heat will be, by a large factor, the more rapid process, with the result that the solid deposited will have almost the same composition as the liquid from which it was formed. With liquid moving rapidly with respect to the cooled surface, eddy transfer of heat and mass obtain, and the rates of mass and heat transfer are of the same order of magnitude. This makes possible the deposition of solid having a composition differing considerably from the melt composition, and in the limit of infinite rate of liquid flow or infinitesimal rate of deposition of solid, a solid in phase equilibrium with the solution. In the present process, a solution ( or a melt ) is pumped in turbulent flow through conduits and is frozen at a slow rate. Therefore, the solid formed will have a composition greatly different from the composition of the solution. The efficiency of impurity rejection is high, because the so-called constitutional super-cooling is surpressed in this operation.

4. The design and construction of the unified freezer-melter.

It has been described that the unified freezer-melter of the present invention is a metal block having honey-combed conduits. The conduits are divided into A-conduits, B-conduits and C-conduits. A-conduits and B-conduits are the main conduits. C-conduits are to be used for auxiliary refrigeration required in the start-up operation and removing heat from the system to maintain heat balance. The amount of heat to be removed by this auxiliary refrigeration unit is equal to the work input to the system and the heat which leaks into the system.

We can distinguish two types of separating walls in a metal block freezer-melter unit. A wall separating two conduits of a set, i.e. a wall separating a A-conduit from another A-conduit or a wall separating a B-conduit from another B-conduit, will be denoted as a α-wall. A wall separating a A-conduit from a B-conduit will be denoted as a β-wall. When circular conduits are used in a metal block a Δ-wall has to be thicker than a β-wall, because the two conduits adjacent to a α-wall are pressurized at the same time and two conduits adjacent to a β-wall are alternatively pressurized and therefore, the maximum stress developed in the wall is higher in the β-wall than in the β-wall. A freezer-melter unit of uniform thickness may be used when oval shaped conduits are used for a freezer-melter unit. This is shown in FIG. 6.

Inlet means to the A-conduits and B-conduits may be provided in the following way to minimize the fablication cost.
 a. plug the conduits at both ends.
 b. drill a hole through each row of A-conduits and B-conduits and provide a common entrance to each row of conduits.

5. Energy input required.

The energy consumption required in operating the present process include the following items:
 a. work required in the pressurization of ice during step 1 and step 3.
 b. work required in circulating brine and fresh water in A-conduits and B-conduits during step 1 and step 3.
 c. work required in the displacement operations in step 2 and step 4.
 d. work required in the auxiliary refrigeration.

The main items in the above list are (a) and (d).

The work required in item (a) can be calculated as follows: Assuming that we are separating fresh water from a brackish water at 5,000 ppm, the freezing point depression is −0.29° C. Allowing 1° C temperature differential fro heat transfer, the applied pressure in the melter should be 129 atmospheres. The amount of fresh water to be pumped into the melter to maintain the pressure during the melting operation is equal to the volume change taking place during the ice-melting operation, which is about 10 percent of the volume of water produced. Therefore, in producing 1,000 gallons fresh water, the work input is $129 \times 14.7 \times 1,000 \times 0.1 = 190,000$ psi-gallons. Allowing for other work requirements, the total energy consumption is in the order of 400,000 psi-gallons or less.

In desalinating of the brackish water by a reverse osmosis process, the operating pressure of 800 psi is required to obtain a water flux of 20 gallons/ft². day. The work required in producing 1,000 gallons of fresh water is equal to $800 \times 1,000 = 800,000$ psi-gallons.

As the above calculations show, the energy consumption for the present process is much less than that of a reverse osmosis process.

3. A single stage process for purifying a substance other than water.

In pruifying a substance other than water, we take advantage of the raising ( rather than lowering ) of the freezing point of the substance due to the application of pressure. All the discussions given in section 1, in connection wit h the separation of fresh water from a aqueous solution apply with appropriate changes. The freezer is operated at a high pressure and the melter is operated at a low pressure. Detailed discussion is omitted, because it is obvious from the discussion given in section 1.

4. A multistage process with a series-parallel flow arrangement.

Assuming that we are separating fresh water from a brackish water at 0.5 percent to such an extent as to reject brine at 3.0 percent. If we use a single stage operation with brine recycle as shown in FIG. 4, ice has to be frozen from the brine at 3.0 percent. The freezing temperature is 1.72° C, and the pressure to be applied in the melter is about 272 atmospheres. If we use a multistage process, say 3 stages, as shown in FIG. 7 by passing the brine through the stages in series and producing ice in each stages, the operating pressures in the first and second stages will be lower than 272 atmospheres. For example, assuming equal water production in each stage, the brine coming out from the first, second and third stages are respectively 0.69 percent, 1.12 percent and 3 percent, and the freezing temperatures are respectively −0.4° C, −0.586° C and −1.72° C. Allowing again 1° C temperature differential for heat transfer in each stage, the operating pressures in these stages are respectively 140 atm, 159 atm and 272 atm. The energy requirement per unit water production can thus be greatly reduced.

5. A multistage process with a counter current flow arrangement.

When a solution whose constituents form solid solutions is to be separated by the present process, the solid separated in the freezing operation will still be a mixture whose composition is different from that of the original solution. In order to obtain a purer constituents, we have to use a multistage countercurrent flow arrangement. FIG. 8 illustrates the operation. Refering to the $n$-th stage, we define $S_n$ = the material stream which is first frozen and remelted in the $n$-th stage.

$L_n$ = the stream which remains unfrozen in the $n$-th stage. In the $n$-th stage, $S_{n-1}$ steam and $L_{n+1}$ are introduced as feed streams and are partially frozen and remelted in the $n$-th stage freezer-melter unit to yield $L_n$ and $S_n$ streams. $S_n$ stream is sent to the $n-1$ stage and $L_n$ stream is set to the $(n-1$th stage. In this way $S_n$-stream is successively enriched with a constituent as n increases and $L_n$ is successively enriched with another constituent as n decreases. It should be noted that we may use a recycle stream within each stream to maintain proper mixing at the solid-liquid interface during the freezing operation to supress constitutional supercooling.

This multistage process can be applied to purification of an organic mixture which forms solid solutions. This process should be compared with the multistage rotary drum crystallization process shown in FIG. 2. The equipment cost in this process is much lower than that of the rotary drum process and operating cost is also much lower because of the efficient heat reuse made in the present process.

The present process finds an interesting application in the initial separation of heavy water from ordinary water. In producing tonnage quantities of heavy water, large equipment must be used to perform the initial separation because of the low feed concentration and the high throughput. By appropriate process staging the amount of materials handled and the size of equipment can be reduced almost in proportion to the increase in concentration of heavy water through the plant. This staging may be done with any of the possible heavy-water processes, or the process may be changed from stage to stage. In a properly staged plant most of the capital investment is incurred in the first hundredfold concentration gain, i.e. from about 0.015 mole percent to 1.5 mole percent heavy water. It is expected that the present process provides a major break through in reducing the manufacturing cost of heavy water by accomplishing the initial separation at a low cost. The separation may take more than 300 stages to accomplish the desired separation, since the separation ratio in each stage is estimated to be 1.02. The separation ratio is defined as the ratio of concentrations of heavy water in the frozen ice and the unfrozen liquid in each stage.

What we claim as our invention and desire to secure by Letter Patent is:

1. A process for effecting a freeze-melt separation of a mixture, comprising a freezing step for at least partially freezing a solid phase from the mixture by removal of heat energy therefrom, and a melting step for melting the solid phase so formed by the addition of heat energy thereto, characterized in that the freezing step and the melting step are conducted simultaneously and at respective pressures which are sufficiently different so that the temperature prevailing in the melting step is lower than the temperature prevailing in the freezing step while maintaining the mixture and said solid phase in indirect heat exchange relationship during the freezing and melting steps thereby to utilize at least a part of the heat liberated in the freezing step for supplying at least a part of the heat needed in the melting step.

2. A process for effecting a freeze-melt separation of a mixture, comprising a freezing step for at least partially freezing a solid phase from the mixture by removal of heat energy therefrom, and a melting step for melting the solid phase so formed by the addition of heat energy thereto, characterized in that the solid phase is maintained substantially in situ during the freezing and melting steps, the freezing and melting steps are conducted simultaneously and at respective pressures which are sufficiently different so that the temperature prevailing in the melting step is lower than the temperature prevailing in the freezing step, and the mixture and said solid phase are maintained in indirect heat exchange relationship during the freezing and melting steps, thereby to utilize at least a part of the heat liberated in the freezing step for supplying at least a part of the heat needed in the melting step.

3. The process as defined in claim 2 wherein said mixture is an aqueous mixture and said melting step is conducted under a pressure substantially greater than the pressure under which the freezing step is conducted.

4. The process as defined in claim 2 wherein said mixture is a non-aqueous mixture and said freezing step is conducted under a pressure substantially greater than the pressure under which the melting step is conducted.

5. The process as defined in claim 2 wherein the mixture is maintained in turbulent flow during the freezing step.

6. A cyclic process for effecting a freeze-melt separation of fluid mixture comprising the steps of
   a. At least partially freezing the mixture by removal of heat energy therefrom to form frozen solids and a mother liquor while simultaneously melting previously formed frozen solids;
   b. separating said frozen solids from said mother liquor;
   c. maintaining said separated frozen solids in indirect heat exchange relation with additional mixture while maintaining said separated frozen solids and said mixture under relative pressures such that the prevailing melting temperature of said frozen solids is less than the prevailing freezing temperature of the mixture, thereby to utilize at least a part of the heat liberated in the freezing step for supplying at least a part of the heat needed to melt said frozen solids so as to form simultaneously therewith additional frozen solids and mother liquor from the mixture.

7. The process as defined in claim 6 wherein said frozen solids are maintained in situ during the freezing and melting thereof.

8. The process as defined in claim 7 wherein said frozen solids are washed by a portion of previously melted frozen solid material prior to the melting thereof.

9. The process as defined in claim 7 wherein said frozen solids are maintained under a pressure greater than the pressure on the mixture.

10. The process as defined in claim 7 wherein said frozen solids are maintained under a pressure lower than the pressure on the mixture.

* * * * *